March 18, 1930.
T. H. THOMAS
1,750,650
ELECTROPNEUMATIC BRAKE EQUIPMENT
Filed Aug. 13, 1928
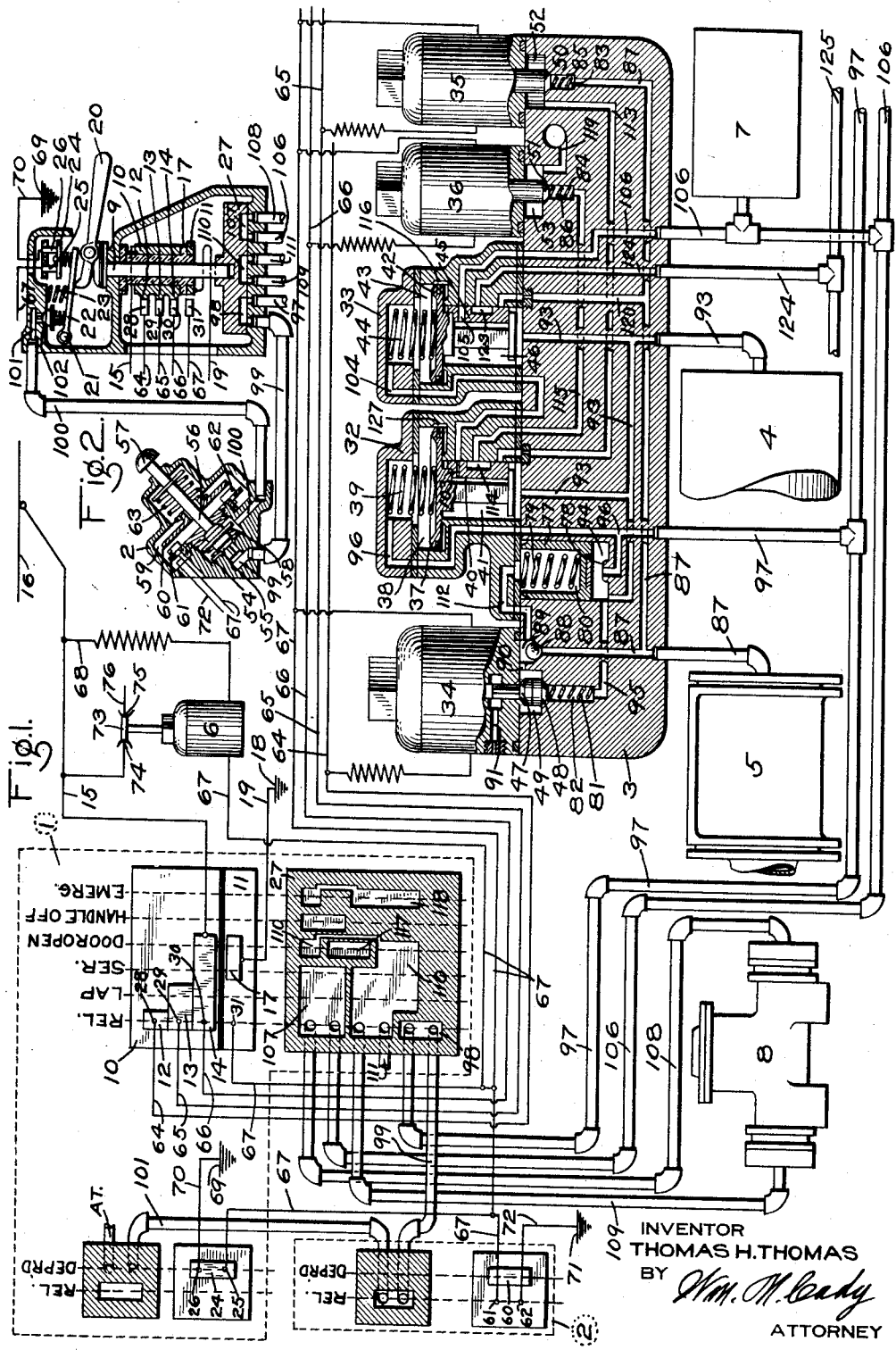
INVENTOR
THOMAS H. THOMAS
BY
Wm. M. Cady
ATTORNEY Patented Mar. 18, 1930

1,750,650

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE EQUIPMENT

Application filed August 13, 1928. Serial No. 299,135.

This invention relates to electro-pneumatic brakes and more particularly to a safety car control and brake equipment.

The principal object of my invention is to provide an improved electro-pneumatic safety car control and brake equipment.

Other objects and advantages will appear in the following more detailed description of the invention.

In the accompanying drawing; Fig. 1 is a diagrammatic view, mainly in section, of an electro-pneumatic safety car control and brake equipment embodying my invention; and Fig. 2 is a detail sectional view of one of the combined brake switch and brake valve devices and also one of the combined foot switch and foot valve devices.

The safety car control equipment shown in the drawing is of the double end type and comprises, at each end of the car, a combined brake switch and brake valve device 1 and a combined foot switch and foot valve device 2. As these devices are identical in construction at both ends of the car only those at one end of the car have been illustrated.

This equipment also comprises an electro-pneumatic brake controlling device 3, a main reservoir 4 or other fluid pressure supply source, a brake cylinder 5, a magnet switch device 6 for controlling the electric circuit to the car motors, and a volume reservoir 7 for supplying fluid under pressure to the usual door engines 8, only one of which engines is shown.

In Fig. 1 of the drawings the combined brake switch and brake valve device 1 and combined foot switch and foot valve device 2 have been shown developed and in Fig. 2 these devices have been shown more in detail.

Each device 1 may be of any suitable construction, but for illustrative purposes only, has been shown as comprising a casing in which there is rotatably mounted a stem or spindle 9. Carried by this spindle are contact drums 10 and 11 which are insulated from each other. The drum 10 has connected contacts 12, 13, and 14 which are permanently connected with a supply wire 15 through which current from a trolley wire 16 may flow by way of the usual trolley wheel and pole. The drum 11 has a single contact 17 which is connected to ground at 18 by a wire 19.

The upper end of the spindle 9 is provided with a removable operating handle or lever 20 which is pivotally mounted on a pivot pin secured to the spindle.

Pivotally mounted on a pin 21 secured to the casing is an arm 22 which is adapted to be engaged by the inner end portion of the lever 20 and this arm is urged downwardly against the lever by the pressure of a coil spring 23 which is interposed between the casing and the arm.

The free end of the arm 22 carries a connector 24 adapted to be moved by the arm into and out of connecting contact with contact terminals 25 and 26 mounted in the casing, the operation of the arm being controlled by the operation of the lever 20.

The lower end portion of the spindle is operatively connected to a rotary valve 27, which valve is for the purpose of assisting in controlling the equipment as will hereinafter appear.

Mounted in the casing are stationary contact terminals 28, 29, and 30 which are adapted to be engaged by the contacts 12, 13, and 14 respectively of the drum 10. Also mounted in the casing is a contact terminal 31 which is adapted to be engaged by the contact 17 of the drum 11.

The electro-pneumatic brake controlling device 3 may comprise a casing containing a service valve device 32, an emergency valve device 33, a release magnet valve device having a magnet 34, a serivce magnet valve device having a magnet 35, and an emergency magnet valve device having a magnet 36.

The service valve device 32 comprises a piston 37 contained in a piston chamber 38 and subject to the pressure of a spring 39, which piston is adapted to operate a slide valve 40 contained in a valve chamber 41.

The emergency valve device 33 comprises a piston 42 contained in a piston chamber 43 and subject to the pressure of a spring 44, which piston is adapted to operate a slide valve 45 contained in a valve chamber 46.

The release magnet 34 is adapted to control the operation of valves 47 and 48 contained in a valve chamber 49 and the service magnet 35 and emergency magnet 36 are adapted to control the operation of valves 50 and 51 respectively contained in chambers 52 and 53.

The combined foot switch and foot valve device 2 may comprise a casing having a valve chamber 54 containing a valve 55 which is operative through the medium of a stem 56 which extends through the casing, the outer end of the stem being provided with a foot button 57. The valve 55 is subject to the pressure of a spring 58 contained in the valve chamber 54. Contained in a chamber 59 is a connector 60 which is adapted to be moved into connecting contact with contact terminals 61 and 62 through the medium of a spring 63 interposed between the stem and connector.

The door engines 8, only one of which is shown, are of the usual type and their operation is controlled through the operation of the rotary valve 27.

The contact terminals 28 of the devices 1 are connected together by a wire 64; the contact terminals 29 by a wire 65; the contact terminals 30 by a wire 66, and the contact terminals 31 by a wire 67.

One of the terminals of each of the magnets 34, 35, and 36 is connected to the wire 67. The other terminals are connected to the wires 64, 65, and 66 respectively.

The wire 67 is connected to the contact terminals 25 and 61 of the devices 1 and 2 respectively and is further connected to one terminal of the magnet switch device 6, the other terminal of the magnet being connected to the supply wire 15 by a wire 68. The contact terminal 26 of the device 1 is connected to ground at 69 by a wire 70 and the contact terminal 62 of the device 2 is connected to ground at 71 by a wire 72.

The magnet switch device 6 has a switch member 73 which is operative into and out of engagement with switch contacts 74 and 75, the contact 74 being connected to the supply wire 15 and the contact 75 being connected to one terminal of the usual car motor (not shown) by a wire 76.

Contained within the casing of the controlling device 3 is a charging valve piston 77 which is adapted to seat on a seat ring 78 and is subject to the pressure of a spring 79 contained in a chamber 80 at one side of the valve piston.

In operation, with the devices 1 and 2, at one end of the car, in release position and the device 1, at the other end of the car, in handle off position and the device 2 in release position, the contacts 12, 13, and 14 on the drum 10 of the device 1 at the head end of the car will engage the contact terminals 28, 29, and 30, so that current supplied to the drum 10 from the trolley wire 16, through the trolley mechanism and the supply wire 15, will flow to the magnets 34, 35, and 36 through wires 64, 65, and 66 respectively.

With the handle 20 of the device 1 at the head end of the car held depressed by an operator, the circuits through the magnets 34, 35, and 36 will be closed and current from each of these magnets will flow to ground 69 over the return wire 67, contact terminal 25 of the device 1, connector 24, contact terminal 26 and wire 70, thus energizing all of these magnets.

Upon energization of the magnet 34 the valve 47 of the release magnet valve device is unseated and the valve 48 seated against the pressure of a spring 81 contained in a spring chamber 82, and upon energization of the magnets 35 and 36 the valves 50 and 51 on the service and emergency valve devices respectively are seated against the pressure of springs 83 and 84 contained in spring chambers 85 and 86 respectively.

With the valve 47 unseated, the brake cylinder 5 is vented to the atmosphere by way of pipe and passage 87, past a ball check 88 contained in a chamber 89, and through this chamber 89, a passage 90, valve chamber 49 and an atmospheric passage 91.

With the valve 48 seated, fluid under pressure from the main reservoir 4 is supplied to the valve chambers 41 and 46 of the service and emergency valve devices 32 and 33 respectively through pipe and passages 93.

Fluid under pressure is also supplied to a chamber 94 at one side of the valve piston 77 through the passage 93 and from this chamber fluid under pressure is supplied to the spring chamber 82 through a passage 95. The pressure of fluid supplied to the chamber 94 acts upon the outer seated area of the valve piston 77, causing it to be moved upwardly from the seat ring 78 against the pressure of the spring 79.

With the valve piston thus unseated, fluid under pressure from the piston valve chamber 94 flows to the chamber 38 at one side of the service piston 37 by way of a passage 96. When the pressures of fluid in the piston chamber 38 and the slide valve chamber 41, acting on the piston 37, are equal, the spring 39 will maintain the piston and slide valve 40 in its downward or release position.

From the passage 96 fluid under pressure flows through a pipe 97, cavity 98 in the rotary valve 27 of the device 1, passage 99 in the device 2 at the head end of the car, past the open valve 55 into valve chamber 54 and from thence through a passage and pipe 100 and a passage 101, the passage 101 opening to the atmosphere. When the handle 20 is held depressed, a valve 102 will be maintained seated through the medium of the arm 22, thus closing communication from the passage 101 to the atmosphere.

With the service valve device in release position, fluid under pressure supplied to the valve chamber 41 will flow to the piston chamber 43 at one side of the emergency piston 42 by way of a restricted port 103 in the service slide valve 40 and passage 104, and when the pressure in this chamber acting on the emergency piston 42 is equal to the pressure of fluid in the valve chamber 46 acting on the other side of the emergency piston, the pressure of the spring 44 will maintain the emergency valve device 33 in release position.

With the emergency valve device 33 in release position, fluid under pressure supplied to the valve chamber 46 flows to the volume reservoir 7 by way of a port 105 in the emergency slide valve 45 and passage and pipe 106. From the pipe 106 fluid under pressure flows to one side of the door engine 8 at the head end of the car by way of a cavity 107 in the rotary valve 27 of the device 1 and pipe 108. The other side of the door engine is connected to atmosphere by way of pipe 109, cavity 110 in the rotary valve 27 and atmospheric pipe 111.

To effect a service application of the brakes, the device 1 at the head end of the car is operated to service position, in which the contacts 12 and 13 on the drum 10 are out of contact with the contact terminals 28 and 29, so that the circuits through the magnets 34 and 35 will be open and the magnets deenergized. In this position of the device 1, the contact 14 on the drum 10 will be in contact with the contact terminal 30 and the contact 17 on the drum 11 will be in contact with the contact terminal 31, so that a circuit through the emergency magnet is maintained closed and the magnets thus maintained energized. It will here be noted that as the return wire 67 is connected to ground 18, through the contact 17 and wire 19, the circuit through the emergency magnet 36 will be maintained closed so that if pressure on the handle 20 is relieved and the device 2 maintained in its normal release position, an undesired electric emergency application of the brakes cannot be effected.

In service position, cavity 110 of the rotary valve 27 connects the application pipe 97 and the pipe 109 from one side of the door engine to atmosphere by way of pipe 111 and the cavity 107 maintains the communication of the pipe 106 with the door engine pipe 108. In this position of the rotary valve 27, communication through the pipe 99 is closed off so that when the handle 20 is released an undesired pneumatic emergency application of the brakes will not be effected.

Upon deenergization of the release magnet 34, the pressure of the spring 81 causes the valve 47 to seat, closing communication from valve chamber 49 to atmosphere, and causing the valve 48 to be unseated. Upon deenergization of the service magnet 35, the pressure of spring 83 causes the valve 50 to be unseated.

With the valve 48 unseated, fluid under pressure in the spring chamber 82, supplied by the reservoir 4 through pipe and passage 93, valve chamber 94 and passage 95, flows past the open valve 48 to the chamber at one side of the valve piston 77 by way of valve chamber 49, passage 90, chamber 89 and a passage 112. When the pressure of fluid in the chamber 80 acting on one side of the valve piston 77 and the pressure of fluid in the chamber 94 acting on the other side of the valve piston equalize, the pressure of the spring 79 causes the valve piston to move downwardly and seat on the seat ring 78, thus closing off the flow of fluid under pressure from the chamber 94 to the piston chamber 38 of the service valve device.

With the rotary valve 27 in service position, fluid under pressure in the piston chamber 38 is vented to the atmosphere by way of passage 96, pipe 97, cavity 110 in the rotary valve 27 and pipe 111. With the chamber 38 thus vented, pressure of fluid in the valve chamber 41 causes the piston 37 to move upwardly against the pressure of the spring 39, said piston carrying with it the slide valve 40 to its service position in which fluid under pressure in the valve chamber 41, supplied by the reservoir 4 through pipe and passage 93, flows to the brake cylinder 5 through a choked passage 113, valve chamber 52 of the service magnet valve device 35, past the unseated valve 50, through chamber 85 and passage and pipe 87.

In the service position of the service valve device, the piston chamber 43 of the emergency valve device leads to the seat of the valve 51 through passage 104, cavity 114 in the service slide valve 40 and passage 115, but as the emergency magnet 36 is maintained energized, the valve 51 is maintained seated so that there will be no loss of fluid under pressure from the piston chamber 43, thus the emergency piston 42 and slide valve 45 will be maintained in their release positions, in which fluid under pressure is supplied to the reservoir 7 and one side of the door engine 8 as described, and the doors at the head end of the car are thus maintained closed. Should there be any leakage from the emergency piston chamber 43, fluid under pressure will be supplied thereto from the valve chamber 46 through a feed groove 116 so that the pressures on opposite sides of the piston are equalized and the piston balanced, thus preventing the emergency piston and emergency valve from being unintentionally operated to their emergency positions.

If it is desired to limit the brake cylinder pressure, the combined brake switch and brake valve device 1 is moved to lap position in which the contact 14 of the drum 10 is maintained in contact with the contact terminal 30, thus maintaining the emergency magnet 36 energized. In this position the contact 13 on the drum 10 contacts with the contact terminal 29, thus energizing the service magnet 35. In lap position the contact 17 is out of contact with the contact terminal 31, thus disconnecting the return wire 67 from ground 18.

Upon energization of the service magnet 35, the valve 50 is seated, thus closing off communication through which fluid under pressure is supplied to the brake cylinder by way of passage and pipe 87.

Further, in lap position, the cavities 107 and 110 in the rotary valve 27 of the device 1 will connect the pipes 99, 97, 111, 106, and 108 in the same manner as described in connection with a service application of the brakes.

To effect a service application of the brakes and to open the doors at the head end of the car, the device 1 is operated to door open position in which an electric service application of the brakes will be effected as described.

With the rotary valve 27 in door open position, one side of the door engine 8 will be vented to the atmosphere by way of pipe 108, cavity 110 in the rotary valve 27 of the device 1 and pipe 111. In this position, fluid under pressure is supplied from the pipe 106 by way of a cavity 117 in the rotary valve 27 and pipe 109, thus causing the engine to operate to open the doors.

To effect an emergency application of the brakes, the device 1 is operated to emergency position in which the contacts 12, 13, and 14 on the drum 10 are out of contact with the contact terminals 28, 29, and 30, thus opening the circuits to the magnets 34, 35, and 36 which causes said magnets to be deenergized.

In emergency position, a cavity 118 in the rotary valve 27 connects the door engine pipes 108 and 109 to atmosphere through pipe 111, thus venting both of the usual piston chambers of the door engine which causes the doors to be balanced so that they may be operated manually. The cavity 118 also connects the application pipe 97 to atmosphere through pipe 111.

With the magnet 34 deenergized, the valve 47 is seated and the valve 48 unseated, and with the magnets 35 and 36 deenergized the valves 50 and 51 respectively are unseated. Fluid under pressure supplied to the valve piston chamber 94 from the main reservoir 4 by way of pipe and passage 93, flows into the valve piston chamber 80 by way of passage 95, spring chamber 82, past the unseated valve 48, through valve chamber 49, passage 90, the check valve chamber 89 and passage 112. When the pressures of fluid in the chambers 80 and 94, acting on opposite sides of the valve piston equalize, the pressure of the spring 79 causes the valve piston 77 to seat on the seat ring, thus closing off the further supply of fluid under pressure to the service piston chamber 38.

Since the rotary valve 27 is in emergency position, fluid under pressure in the piston chamber 38 is vented to the atmosphere by way of passage 96, pipe 97, cavity 118 in the rotary valve 27 and pipe 111.

Pressure of fluid in the service valve chamber 41 acting on the under side of the piston 37 causes it, together with the service slide valve 40, to move upwardly to their service positions in which fluid under pressure in the emergency piston chamber 43 is vented to the atmosphere by way of passage 104, cavity 114 in the service slide valve 40, passage 115, past the open valve 51, valve chamber 53 and atmospheric passage 119.

With the emergency piston chamber 43 thus vented, pressure of fluid in the valve chamber 46 acting on the under side of the emergency piston 42 causes the piston and emergency slide valve 45 to move upwardly, against the pressure of the spring 44, to their emergency positions in which fluid under pressure from the valve chamber 46, which is supplied from the main reservoir 4 by way of pipe and passage 93, flows to the brake cylinder 5 by way of a choked passage 120 and passage and pipe 87.

When the service valve device 32 is operated to its service position, the slide valve 40 uncovers the passage 113, and since the valve 50 is unseated, fluid under pressure from the valve chamber 41 will also flow to the brake cylinder 5 by way of passage 113, valve chamber 52 of the service magnet valve device, past the unseated valve 50, through spring chamber 85 and pipe and passage 87. It will thus be noted that in a service application of the brakes fluid under pressure is supplied to the brake cylinder through the restricted passage 113 only, while in an emergency application, fluid under pressure is supplied to the brake cylinder through the passage 113, as well as through the passage 120, so that an emergency application will be effected at a faster rate than a service application can be effected.

When the emergency slide valve is moved to emergency position, fluid under pressure from the volume reservoir 7 flows down through the usual sand traps (not shown) by way of pipe and passage 106, a cavity 123 in the emergency slide valve 45, a passage and pipe 124 and sanding pipe 125. It will be noted that there will be no loss of fluid under pressure from the reservoir 4 through the devices 1 since the rotary valve 27 of the device at the head end of the car laps the pipe 106 and the rotary valve of the device at the rear end of the car connects the pipe 106 to the door engine pipe 108 through a cavity 126 in the rotary valve 27.

To effect the release of the brakes after a service or an emergency application, the device 1 is operated to release position in which the magnets 34, 35, and 36 are energized, seating the valves 48, 50, and 51 respectively and unseating the valve 47 of the service magnet valve device.

With the valve 47 thus unseated, fluid under pressure in the brake cylinder is released to the atmosphere by way of pipe and passage 87, past the ball check 88, through chamber 89, passage 90, valve chamber 49, past the unseated valve 47 and through atmospheric passage 91. It will thus be seen that an emergency application of the brakes may be released substantially as quickly as a service application may be released. This is a desirable feature when the car is being operated in traffic congested areas where quick applications and release of the brakes is necessary.

With the valve 47 unseated, fluid under pressure in the valve piston chamber 8 is vented to the atmosphere by way of passage 112, ball check valve chamber 89, passage 90, valve chamber 49, past the open valve 47 and through atmospheric passage 91. Pressure of fluid in chamber 94 acting on the under side of the valve piston causes it to be unseated from the seat ring 78 and fluid is supplied to the service piston chamber 38 by way of passage 96 leading from the chamber 94.

When the pressure of fluid in the chamber 38 acting on one side of the piston 37 equals the pressure of fluid in the chamber 41 acting on the other side of the piston, the pressure of the spring 39 causes the piston and slide valve 40 to move downwardly to their release positions, in which fluid under pressure is again supplied to the emergency piston chamber 43 by way of the port 103 in the service slide valve 40 and passage 104, and when the pressure in this chamber acting on one side of the emergency piston 42 equals the pressure of fluid acting on the other side of the piston, the pressure of the spring 44 causes the piston and slide valve to move to their release positions.

With the emergency slide valve in release position, fluid under pressure will again be charged with fluid under pressure by way of the port 105 in the emergency slide valve and passage and pipe 106. From the pipe 106 fluid under pressure flows to one side of the door engine 8 by way of cavity 107 in the rotary valve 27 and pipe 108, thus causing the door engine to operate to close the doors.

In changing ends the operator first operates the device 1 at the head end of the car to effect an application of the brakes and then operates the device to handle off position at which position the handle 20 may be removed. Now, when the handle is mounted in the device 1 at the rear end of the car and turned to release position, the release of the brakes will be effected as described.

Should the operator be incapacitated when the device 1, at the head end of the car, is in release position, and his pressure on the handle 20 be relieved, the pressure of the spring 23 will cause the arm 22 to move downwardly and the connector 24 will move with it out of contact with the contact terminals 25 and 26, thus disconnecting the return circuit wire 67 from ground 69, causing the deenergization of the magnets 34, 35, and 36, so that an emergency application of the brakes will be effected.

In lap position, the pipe 99 leading to the device 2 is lapped so that, if the operator is incapacitated, the return wire 67 will, due to the automatic operation of the handle 20, be disconnected from ground and an electric emergency application will be effected as described.

Should the operator wish to release the handle 20, he may, if he so desires, prevent an emergency application of the brakes from being effected by first depressing the foot button 57 to cause the return wire 67 to be connected to ground 71, thus maintaining the desired magnet circuits closed.

Should there be an electric power supply failure when the device 1 at the head end of the car is in release position and when the handle 20 of the device 1 or the foot button 57 is depressed, an emergency application of the brakes will not result for the reason that either the valve 55 or 102 will be maintained seated, thus closing communication of the application pipe 97 with atmosphere so that the pressure of fluid in the service piston chamber 38 will be maintained. Under such conditions, the operator may, if he so desires, effect an application of the brakes and this is accomplished by operating the lever 20 to unseat the valve 102, or if he is holding the foot valve 55 seated, the application may be effected by relieving his pressure on the foot button 57. It will thus be seen that in case of a power supply failure the operator does not necessarily lose control of the brakes.

In the case of a power failure, the valve piston 77 will seat and cut off the supply of fluid under pressure to the service piston chamber 38 as hereinbefore described, and in such a case, to prevent the leakage of fluid under pressure from the pipe 97 and piston chamber 38 which might permit the unintentional operation of the piston 37 and slide valve 40 to effect an application of the brakes, I provide a feed groove 127 through which pressure on both sides of the piston may equalize, thus preventing the unintentional operation of the service piston 37 and slide valve 40 to service position.

When an unintentional emergency application of the brakes is effected, which might be due to the incapacitation of the operator, the circuit wire 67 connected to one terminal of the magnet of the magnet valve device 6 will be disconnected from ground, thus opening the circuit through the magnet, causing it to be deenergized. Upon the deenergization of this magnet, the connector 73 will be moved out of contact with the contact terminals 74 and 75, thus opening the car motor circuit so that the motors will no longer operate to propel the car.

In the case of an intentional emergency application of the brakes, the operator does not necessarily lose control of the motor circuit, for if he maintains either the handle 20 or foot button 57 depressed, the circuit wire 67 will be connected to ground as described and the magnet will thus be maintained energized and the motor circuit closed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an electro-pneumatic brake, the combination with three electro-magnets normally energized, of an application pipe normally charged with fluid under pressure, and means operative upon a reduction in the pressure of fluid in said pipe and the deenergization of two of said electro-magnets for effecting a service application of the brakes, and operative upon a reduction in the pressure of fluid in said pipe and the deenergization of all of said magnets for effecting an emergency application of the brakes.

2. In an electro-pneumatic brake, the combination with three electro-magnets normally energized, of an application pipe normally charged with fluid under pressure, and means operative upon a reduction in the pressure of fluid in said pipe and the deenergization of two of said electro-magnets for effecting a service application of the brakes, and operative upon a reduction in the pressure of fluid in said pipe and the deenergization of all of said magnets for effecting an emergency application of the brakes, and means operative to control the pressure of fluid in said pipe and to control the electric circuits through said electro-magnet.

3. In an electro-pneumatic brake, the combination with three electro-magnets normally energized, of an application pipe normally charged with fluid under pressure, and means operative upon a reduction in the pressure of fluid in said pipe and the deenergization of two of said electro-magnets for effecting a service application of the brakes, and operative upon a reduction in the pressure of fluid in said pipe and the deenergization of all of said magnets for effecting an emergency application of the brakes, and means operative to simultaneously control the pressure of fluid in said pipe and the operation of said electro-magnets.

4. In an electro-pneumatic brake, the combination with three electro-magnets normally energized, of an application pipe normally charged with fluid under pressure, and means operative upon a reduction in the pressure of fluid in said pipe and the deenergization of two of said electro-magnets for effecting a service application of the brakes, and operative upon a reduction in the pressure of fluid in said pipe and the deenergization of all of said magnets for effecting an emergency application of the brakes, and a combined brake switch and brake valve device operative to control the operation of said electro-magnets and to control the pressure of fluid in said pipe.

5. In an electro-pneumatic brake, the combination with a plurality of electro-magnets normally energized, of an application pipe normally charged with fluid under pressure, means operative upon the deenergization of at least two of said electro-magnets and the reduction in the pressure of fluid in said pipe for effecting an emergency application of the brakes, and means under the control of an operator for preventing a reduction in pressure in said pipe when said electro-magnets are deenergized upon a current supply failure.

6. In an electro-pneumatic brake, the combination with a plurality of electro-magnets normally energized, of an application pipe normally charged with fluid under pressure, means operative upon the deenergization of at least two of said electro-magnets and the reduction in the pressure of fluid in said pipe for effecting an emergency application of the brakes, and means for controlling the brakes in the event of said electro-magnets being deenergized upon a current supply failure.

7. In an electro-pneumatic brake, the combination with a plurality of electro-magnets normally energized, of an application pipe normally charged with fluid under pressure, means operative upon the deenergization of at least two of said electro-magnets and the reduction in the pressure of fluid in said pipe for effecting an emergency application of the brakes, and means for preventing an application of the brakes from being effected upon the deenergization of said electro-magnets caused by a current supply failure.

8. In an electro-pneumatic brake, the combination with a plurality of electro-magnets normally energized, of an application pipe normally charged with fluid under pressure, means operative upon the deenergization of at least two of said electro-magnets and the reduction in the pressure of fluid in said pipe for effecting an emergency application of the brakes, and valve means under the control of an operator for preventing an application of the brakes when said electro-magnets are deenergized by a failure in the current supply and operative to effect an application of the brakes while the current is off.

9. In an electro-pneumatic brake, the combination with a plurality of electro-magnets normally energized, of an application pipe normally charged with fluid under pressure, means operative upon the deenergization of at least two of said electro-magnets and the reduction in the pressure of fluid in said pipe for effecting an emergency application of the brakes, and valve means having one position for preventing the reduction of pressure of fluid in said pipe when said electro-magnets are deenergized upon a current supply failure and operative to another position to reduce the pressure of fluid in said pipe to effect an application of the brakes while the current supply is off.

10. In an electro-pneumatic brake, the combination with a plurality of electro-magnets normally energized, of an application pipe normally charged with fluid under pressure, and means operative upon the deenergization of two of said electro-magnets and the reduction in the pressure of fluid in said pipe for effecting a service application of the brakes and operative upon the reenergization of one of said deenergized electro-magnets to hold the brakes applied.

11. In an electro-pneumatic brake, the combination with a plurality of electro-magnets normally energized, of an application pipe normally charged with fluid under pressure, and means operative upon the deenergization of two of said electro-magnets and the reduction in the pressure of fluid in said pipe for effecting a service application of the brakes and operative upon the reenergization of both of said deenergized electro-magnets and the recharging of said pipe with fluid under pressure for effecting the release of the brakes.

12. In an electro-pneumatic brake, the combination with a plurality of electro-magnets normally energized, of an application pipe normally charged with fluid under pressure, a brake cylinder, and two valve devices for establishing communication through which fluid under pressure is supplied to said brake cylinder to effect an application of the brakes, one of said valve devices being operative upon a reduction in the pressure of fluid in said pipe and the other being operative upon the deenergization of one of said magnets.

13. In an electro-pneumatic brake, the combination with an application pipe, of a plurality of normally energized electro-magnets, a valve piston for controlling the supply of fluid under pressure to said pipe, means operative upon the deenergization of one of said electro-magnets for effecting the operation of said valve piston to close off the supply of fluid under pressure to said pipe, and means operative upon the deenergization of another of said magnets and the reducing of the pressure of fluid in said pipe for effecting an application of the brakes.

14. In an electro-pneumatic brake, the combination with an application pipe, of a plurality of normally energized electro-magnets, a valve piston for controlling the supply of fluid under pressure to said pipe, means operative upon the deenergization of one of said electro-magnets for effecting the operation of said valve piston to close off the supply of fluid under pressure to said pipe, means operative upon the deenergization of another of said electro-magnets and the reduction in the pressure of fluid in said pipe for effecting an application of the brakes, and means operative to reduce the pressure of fluid in said pipe and to control the operation of said electro-magnets.

15. In an electro-pneumatic brake, the combination with a brake cylinder, of a pneumatically controlled valve device and an electrically controlled valve device for supplying fluid under pressure to said brake cylinder, and a valve device pneumatically controlled by the first mentioned valve device and another electrically controlled valve device for also supplying fluid under pressure to said brake cylinder.

16. In an electro-pneumatic brake, the combination with a brake cylinder, of an emergency valve device operative to supply fluid under pressure to said brake cylinder, of a service valve device and a magnet valve device operative to supply fluid under pressure to said brake cylinder, said service valve device and another magnet valve device being adapted to control the operation of said emergency valve device.

17. In an electro-pneumatic brake, the combination with a brake cylinder, of a service valve device, an emergency valve device and a magnet valve device operative to supply fluid under pressure to said brake cylinder to effect an emergency application of the brakes, and a magnet valve device which together with said service valve device controls the operation of said emergency valve device.

18. In an electro-pneumatic brake, the combination with an application pipe, of a valve piston normally supplying fluid under pressure to said pipe, electro-magnets, a valve operative upon deenergization of one of said electro-magnets to effect the operation of said valve piston close off the supply of fluid under pressure to said pipe, a valve device operative upon a reduction in the pressure of fluid in said pipe and a valve operative upon the deenergization of another of said magnet valve devices for supplying fluid under pressure to said brake cylinder to effect an application of the brakes, and means for controlling the circuits through said electromagnets and for controlling the reduction of the pressure of fluid in said pipe.

19. In an electro-pneumatic brake, the combination with an application pipe, of a valve piston normally supplying fluid under pressure to said pipe, electro-magnets, a valve operative upon deenergization of one of said electro-magnets to effect the operation of said valve piston to close off the supply of fluid under pressure to said pipe, a valve device operative upon a reduction in the pressure of fluid in said pipe and a valve operative upon the deenergization of another of said magnet valve devices for supplying fluid under pressure to said brake cylinder, a valve device operative upon a reduction in the pressure of fluid for also supplying fluid under pressure to said brake cylinder, a valve operative upon the deenergization of another of said electro-magnets and the first mentioned valve device in its pressure supplying position establishing communication through which fluid under pressure from the second mentioned valve device is reduced.

20. In an electro-pneumatic brake, the combination with an application pipe, of a valve piston normally supplying fluid under pressure to said pipe, electro-magnets, a valve operative upon deenergization of one of said electro-magnets to effect the operation of said valve piston to close off the supply of fluid under pressure to said pipe, a valve device operative upon a reduction in the pressure of fluid in said pipe and a valve operative upon the deenergization of another of said magnet valve devices for supplying fluid under pressure to said brake cylinder, a valve device operative upon a reduction in the pressure of fluid for also supplying fluid under pressure to said brake cylinder, a valve operative upon the deenergization of another of said electro-magnets and the first mentioned valve device in its pressure supplying position establishing communication through which fluid under pressure from the second mentioned valve device is reduced, and means operative to control the operation of said electro-magnets and the reduction of fluid under pressure in said pipe.

In testimony whereof I have hereunto set my hand, this 7th day of August, 1928.

THOMAS H. THOMAS.